United States Patent
Kimata

[11] 3,802,221
[45] Apr. 9, 1974

[54] CONSTANT VELOCITY UNIVERSAL JOINT
[75] Inventor: Kei Kimata, Aichi-ken, Japan
[73] Assignee: Toys Bearing Manufacturing Company Limited, Osaki-shi, Japan
[22] Filed: May 24, 1972
[21] Appl. No.: 256,423

[30] Foreign Application Priority Data
May 25, 1971  Japan.............................. 46-36070

[52] U.S. Cl............................................ 64/21, 64/8
[51] Int. Cl................................................. F16d 3/30
[58] Field of Search ........................ 64/21, 8, 7, 6

[56] References Cited
UNITED STATES PATENTS
1,635,565  7/1927  Trumpler et al......................... 64/6
1,862,220  6/1932  Johnson.................................. 64/6
2,653,456  9/1953  Heym...................................... 64/7
2,897,660  8/1959  Croset..................................... 64/6

FOREIGN PATENTS OR APPLICATIONS
329,990   7/1930   Great Britain......................... 64/21
978,230  12/1964   Great Britain......................... 64/21
785,242  10/1935   France................................... 64/21

Primary Examiner—Benjamin W. Wyche
Assistant Examiner—Randall Heald
Attorney, Agent, or Firm—Hall & Houghton

[57]  ABSTRACT

Particulars of a universal joint which, when it is desired to transmit a rotational power between two shafts joined together with their axes crossing each other, is designed to transmit a high rotational power particularly at a contact speed.

8 Claims, 14 Drawing Figures

CONSTANT VELOCITY UNIVERSAL JOINT

SUMMARY OF THE INVENTION

The present invention relates to a constant velocity joint for connection between two shafts for transmission of power from a driving shaft to a driven shaft. More particularly it comprises an outer member having a hollow bore for fixedly receiving a central shaft to integrally define an annular groove, three guide grooves provided in said annular groove, a torque member inserted in the annular groove of the outer member and bored with three openings, and balls inserted in the guide groove and openings for power transmission between the outer member and the torque member.

BRIEF DESCRIPTION OF THE DRAWINGS

In the accompanying drawings showing preferred embodiments of the present invention.

DESCRIPTION OF THE PREFERRED EMBODIMENT

Figure 1:
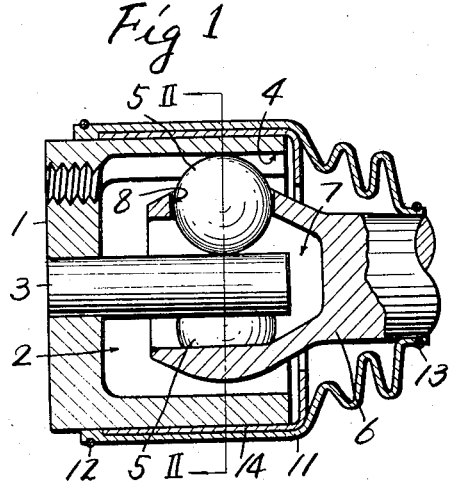
FIG. 1 is a side view, in longitudinal section, of a first embodiment of the constant velocity joint of the invention.
Figure 2:
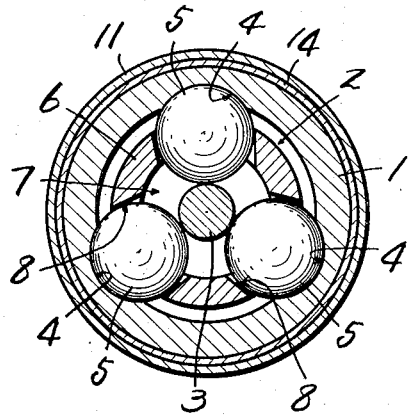
FIG. 2 is a section taken along the line II — II of FIG. 1.
Figure 3:
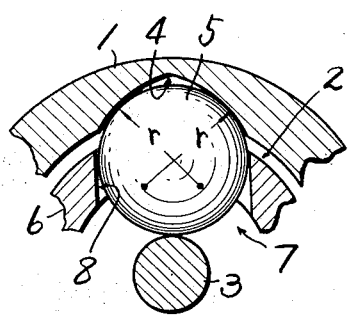
FIG. 3 is an enlarged view of part of the first embodiment.

In a first embodiment shown in FIGS. 1 through 3, an outer member 1 has a hollow bore 2 and a central shaft 3 is fixedly secured in the central region of the hollow bore 2 to define an annular groove. The inner peripheral surface of the outer member 1, i.e., the outer peripheral surface of the annular groove is provided with three equally spaced axially extending parallel guide grooves 4. The cross-section of each guide groove 4, as shown in FIG. 3, is generated by a portion of an ellipse, a plurality of arcs, a parabola, a hyperbola or a combination thereof so that the guide grooves 4 make angular contact with balls 5. Thus, the guide grooves 4 and the balls make contact with each other at two points $c, c$, and the radius of curvature of the grooves 4 is greater than the radius of the balls 5. A torque member 6 provided with a hollow portion 7 at the front end is bored with three openings 8 of the same diameter as the balls 5 corresponding to the guide grooves 4 in the outer member 1. The balls 5 are received in the openings 8 in the torque member 6 and are fitted in the guide grooves 4 in the outer member 1 for power transmission between the outer member 1 and the torque member 6. The torque member 6 is axially movable along the guide grooves 4 in the outer member 1 with the aid of the balls and are also angularly displaceable to a certain extent with respect to the axis of the outer member 1. The torque member 6 may be connected to a driving shaft, and the outer member 1 to a driven shaft, or vice versa, whereby torque can be transmitted from the driving shaft to the driven shaft. As shown in FIGS. 1, 2, a cap member 14 fixedly secured around the opening end of outer member 11 prevents slip-off of torque member 6, and a flexible covering member 11 made of rubber or the like is provided to cover the joint portion of outer member 1 and torque member 6 with the both ends thereof firmly clapped against the corresponding members 1, 6 by means of clamping rings 12, 13.

The covering member not only keeps the joint portion free from dust, but also serves as a seal member for the grease enclosed therein. It should be understood that FIGS. 4 through 9 have been illustrated without said covering irrespective of the actual embodiments of the invention.

Figure 4:
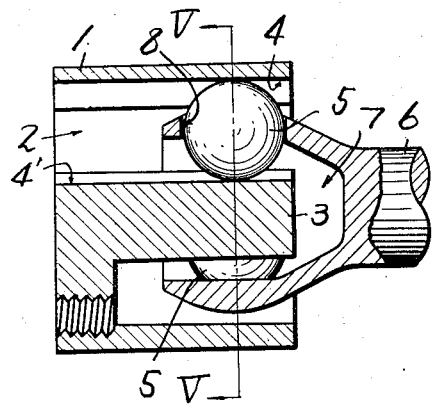
FIG. 4 is a side view, in longitudinal section, of a second embodiment of the constant velocity joint.
Figure 5:
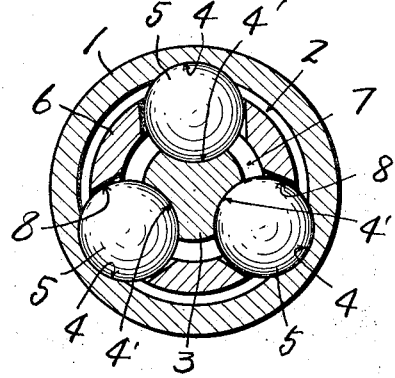
FIG. 5 is a section taken along the line V — V of FIG. 4.

A second embodiment of the present invention will now be described with reference to FIGS. 4 and 5. In this embodiment, the inner and outer peripheral surfaces of an annular groove, i.e., the inner peripheral surface of an outer member 1 and the outer peripheral surface of a central shaft 3 are provided with three axially extending parallel guide grooves 4, 4', respectively. The guide grooves 4' and balls 5 make angular contact with each other.

Figure 6:
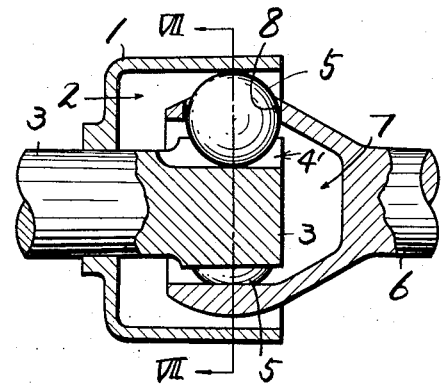
FIG. 6 is a side view, in longitudinal section, of a third embodiment of the constant velocity joint.
Figure 7:
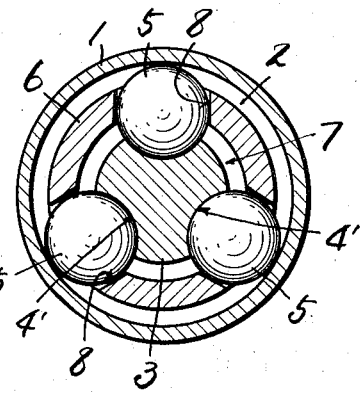
FIG. 7 is a section taken along the line VII — VII of FIG. 6.

FIGS. 6 and 7 show a third embodiment of the invention wherein the guide grooves in the inner peripheral surface of the outer member 1 are eliminated and instead the guide grooves 4' in the central shaft 3 are made deeper to effect the transmission of torque between the torque member and a driven shaft connected to the central shaft 3. In addition, the guide grooves 4' and the balls 5 make angular contact with each other.

Figure 8:
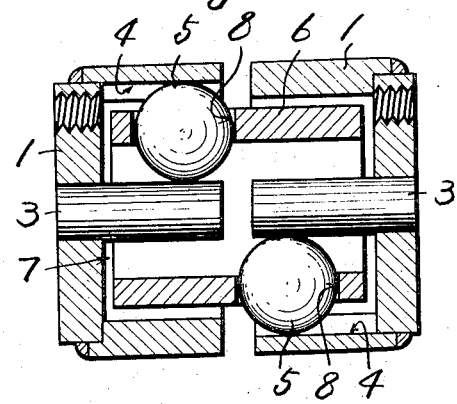
FIG. 8 is a longitudinal section of a constant velocity joint showing an application of the first embodiment.

In FIG. 8, a torque member 6 is circumferentially provided with two rows of openings 8, and central shafts are fixedly secured in the central region of the hollow portion. Two outer members 1, 1 whose inner peripheral surfaces are provided with guide grooves 4 parallel to the central shafts 3 are inserted from the opposite ends of a torque member. In this case, one of the outer members is connected to a driving shaft, and the other to a driven shaft. In addition, the guide grooves may be formed in the central shafts or both in the outer members and in the central shafts.

Figure 9:
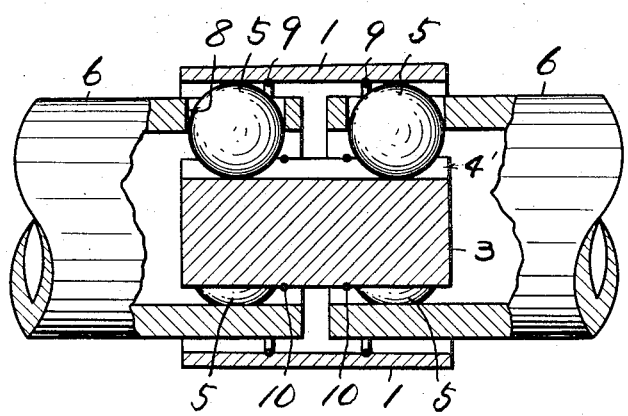
FIG. 9 is a longitudinal section of a constant velocity joint showing an application of the third embodiment.

In FIG. 9, torque members 6 are inserted from the opposite ends of an outer member 1 and central shaft 3 and the formation of the guide grooves is the same as that shown in FIG. 8. In addition, the axial movement of the outer member 1 and the central shaft 3 is effected by snap rings 9 and 10.

Figure 10:
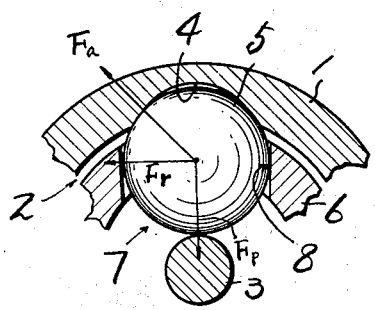
FIG. 10 is an explanatory view showing the relationship between forces acting on a ball of the constant velocity joint in the first embodiment.
Figure 11:
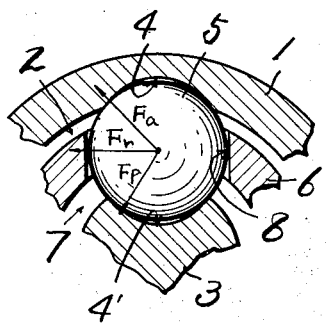
FIG. 11 is an explanatory view of the relationship between forces acting on a ball of the constant velocity joint in the second embodiment.
Figure 12:
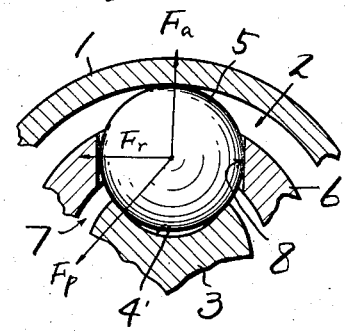
FIG. 12 is an explanatory view showing the relationship between forces acting on a ball of the constant velocity joint in the third embodiment.

FIG. 10 shows forces acting on a ball 5 when the torque member 6 of the joint of the first embodiment shown in FIGS. 1 and 2 is loaded with a torque. The ball 5 is pressed tangentially of the pitch circle by the opening 8 in the torque member 6 with a force which is expressed by $F_T = $ (torque/3)pitch circle radius. $F_T$ resolved into components, one $F_a$ at the point of contact between the ball 5 and the outer member 1 and the other $F_p$ at the point of contact between the ball and the central shaft 3, so that torque is transmitted. FIGS. and 12 show forces acting on a ball when a torque is applied to the second embodiment (shown in FIGS. 4 and 5) and the third embodiment (shown in FIGS. 6 and 7), respectively. The second embodiment is the most advantageous in respect of the force of contact between the outer member and the ball.

Figure 13:
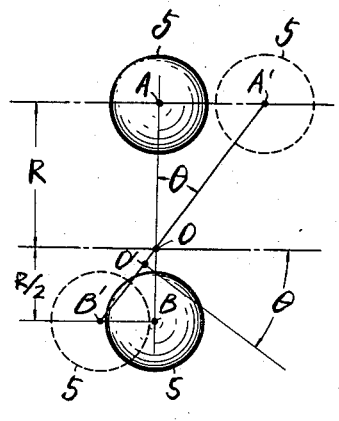
FIG. 13 shows the positional relationship between balls and a torque member as esablished when the torque member is angularly displaced.
Figure 14:
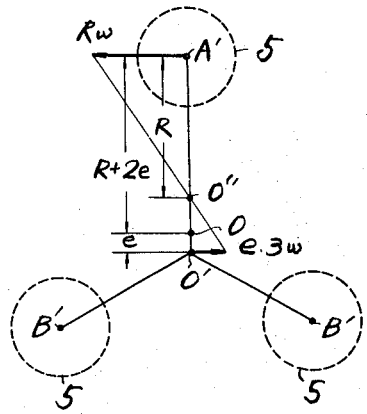
FIG. 14 is a section taken along the line A'–B' of FIG. 13.

The important feature of the present joint resides in providing constant velocity. This will now be described with reference to FIGS. 13 and 14. In FIG. 1 if the torque member 6 is displaced by an angle of $\theta$ in the plane of the paper with respect to the outer member, than, as shown in FIG. 13, the balls 5 are moved along the guide grooves 4 from A to A' and B to B', respectively. Designated at O' is the point of intersection between the axis of the angularly displaced torque member 6 and the central plane of the openings. Since $\overline{OB} = \overline{O'B'}$, $\overline{OO'} = (R/2)(\sec\theta - 1) = e$ and $\overline{OA} = R\sec\theta = R + 2e$. When the outer member is rotated at an angular velocity of $\omega$, the point O is rotated at an angular velocity of $3\omega$ around O. FIG. 14 is a section taken along the line A'-B' of FIG. 13, and shows the peripheral velocities of the points A' and B'). The instantaneous center of motion ff the torque member 6 is located at the point O. Since $\overline{OO'} = e$ and $\overline{OA'} = R + 2e$, $\overline{O''A'} = R$. Thus it follows that the torque member 6 is rotated around its instantaneous center of motion O'' at the same angular velocity $\omega$ as the outer member 6. The above description is not general, but the present joint, in short, maintains constant velocity due to the fact that the instantaneous center of motion of the torque member 6 deviates from the axis of the outer member 1.

As has been described so far, the present invention comprises an outer member 1 having a central shaft 3 fixedly secured in the central region of the hollow bore 2 thereof to define an annular groove, said outer member having axially extending parallel guide grooves provided in one or both of the inner and outer peripheral surfaces 4 and 4' of the annular groove, a torque member 6 bored with openings 8 in the hollow portion 7 thereof, and balls 5 inserted in the guide grooves 4, 4' and opening 8, the arrangement being such that power transmission between the outer member 1 and the torque member 6 is effected through the balls 5. Therefore, it is possible to move the torque member axially for adjustment or angularly displace the axis with respect to the outer member. Further, since the annular groove is defined by the outer member and the central shaft which are integrally connected together, it is unnecessary to separately provide a retainer and an inner member, so that the construction of the joint can be simplified. Further, even if the guide grooves in one of the inner and outer surfaces of the annular groove are omitted, it is possible to effect power transmission between the torque member and the outer member. As a result, the manufacture and assembly of components becomes simplified, reducing the cost of manufacture of the constant velocity joint.

Whiles there have been described herein what are at present considered preferred embodiments of the several features of the invention, it will be obvious to these skilled in the art that modifications and changes may be made without departing from the essence of the invention.

It is therefore to be understood that the examplary embodiments thereof are illustrative and not restrictive of the invention, the scope of which is defined in the oppended claims and that all modifications that come within the meaning and range of equivalency of the claims are intended to be included therein.

I claim:

1. A constant velocity universal joint for use between two shafts for transmission of power from a driving shaft to a driven shaft, comprising a housing member having a hollow bore formed therein from one side thereof, a central shaft fixedly positioned centrally within said housing member thereby forming an annular groove with said hollow bore within said housing member, three equally spaced axially extending grooves formed in the inside peripheral wall of said housing member, a torque member having a cylindrical hollow portion at one end thereof positioned within the formed annular groove of said housing member, three equally spaced openings in said hollow portion of said torque member complementary with said axially extending grooves of said housing member, and a ball bearing positioned in each of said openings of said torque member and its complementary axially extending groove of said housing member whereby power transmission between said housing member and said torque member is accomplished through said ball bearings.

2. A constant velocity universal joint as set forth in claim 1, characterized in that the torque member includes an integrally formed shaft at the end remote from the hollow portion thereof.

3. A constant velocity universal joint as set forth in claim 1, characterized in that the central shaft and the housing member are fixedly secured to one end of a shaft.

4. A constant velocity universal joint as set forth in claim 1, characterized in that the housing member includes an integrally formed shaft extending outwardly therefrom at one end thereof and the central shaft is fixedly secured to the housing member.

5. A constant velocity joint as set forth in claim 1, characterized in that the openings in the hollow portion of the torque member and the guide grooves in the housing member are equispaced in a plane perpendicular to the axis thereof.

6. A constant velocity universal joint as set forth in claim 1, characterized in that the cross-sectional shape of the guide grooves in the housing member, as viewed in a direction parallel to the axis thereof, is such that each guide groove makes contact with the associated ball at two points.

7. A constant velocity universal joint as set forth in claim 1, characterized in that two annular torque members are provided, said two torque members being inserted from the opposite ends of the housing member into the formed annular groove within the housing and each of said torque members is provided with openings, and each opening is provided with a ball bearing.

8. A constant velocity universal joint for use between two shafts for transmission of power from a driving shaft to a driven shaft, comprising two housing members, each having a hollow bore formed therein from one side thereof, said housing members being in alignment with one another with said open end of each being in face to face engagement, a central shaft fixedly positioned centrally within each of said housing members and extending in the direction of one area thereby forming an annular groove with each said hollow bore within said aligned housing members, three equally spaced axially extending grooves formed in the inside peripheral wall of at least one of said housing members, a torque member having opposed ends, said housing member being fitted with said torque member from the opposed ends of said torque member, two circumferential rows of openings in said torque member complementary with the axially extending grooves of said housing members, and a ball bearing positioned in each of said openings of said torque member and its complementary axially extending groove of said housing member whereby power transmission between said housing members and said torque member is accomplished through said ball bearings.

* * * * *